Sept. 30, 1947.  G. E. BUSKE  2,428,199
INTERNAL-COMBUSTION ENGINE
Filed March 27, 1946  2 Sheets-Sheet 2
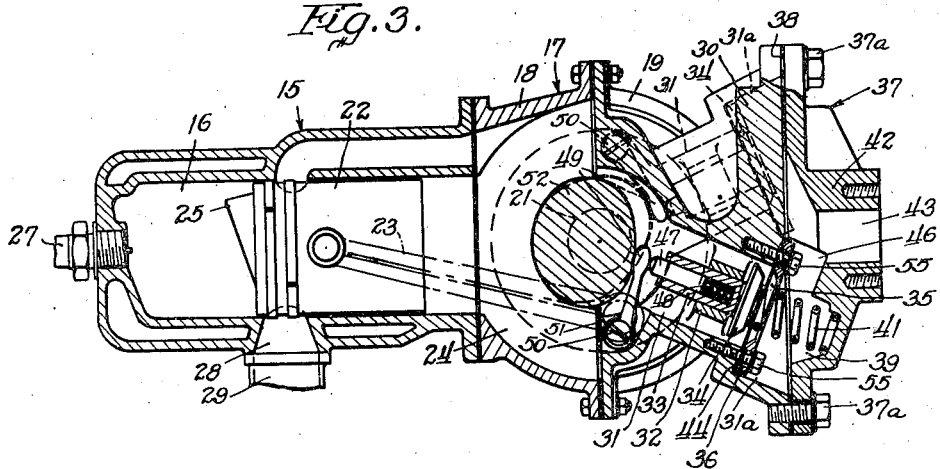
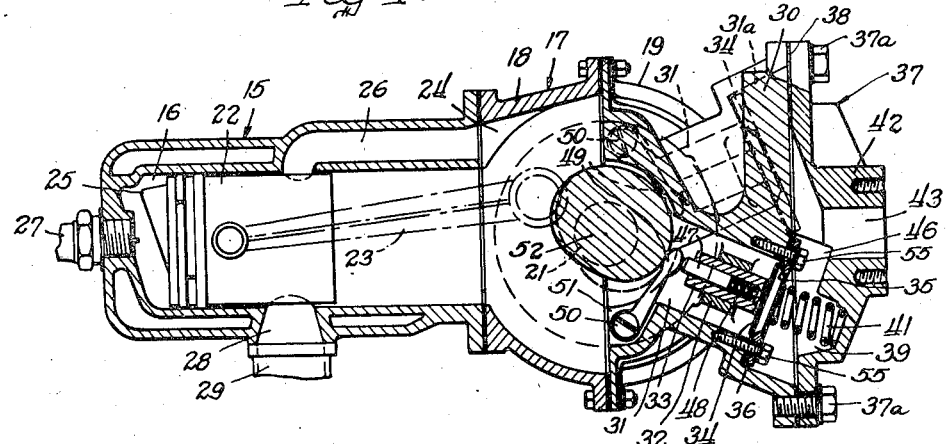
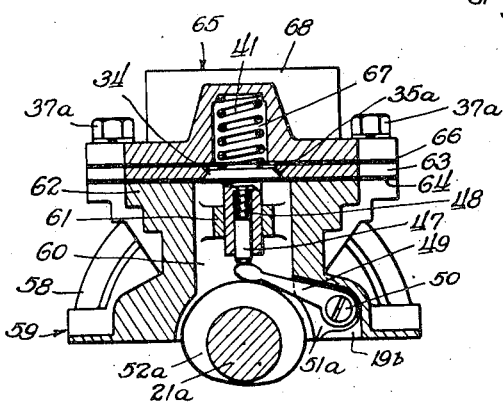
Inventor:
Gilbert E. Buske,
By Brown, Jackson, Boettcher & Dienner
Attys.

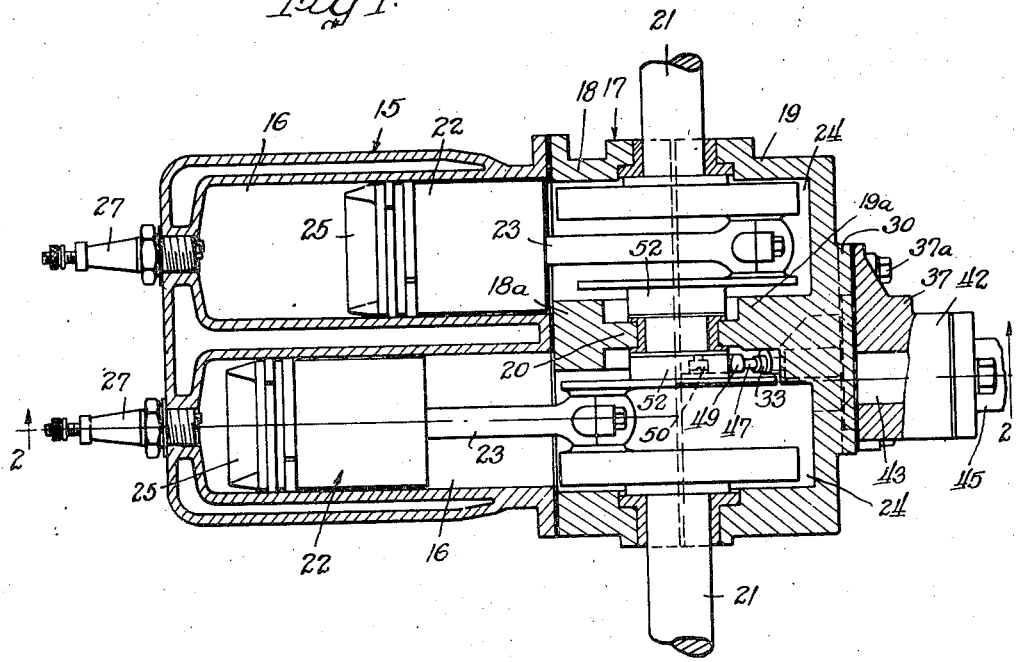

Patented Sept. 30, 1947

2,428,199

UNITED STATES PATENT OFFICE 2,428,199

INTERNAL-COMBUSTION ENGINE

Gilbert E. Buske, Anson Township, Chippewa County, Wis., assignor to National Pressure Cooker Company, Eau Claire, Wis., a corporation of Wisconsin Application March 27, 1946, Serial No. 657,518

10 Claims. (Cl. 123—73)

My invention relates to internal combustion engines of the two cycle type.

Engines of this type employing mechanically operated intake valves are known. Two cycle engines are generally adopted in order to provide a compact high speed power plant. Such engines are employed in outboard motors, for operating electric generators, and for numerous other purposes.

In order to develop power of an engine of this character at high speed, the valves must be actuated so as to give the desired full opening and closing in exceedingly brief periods of time. The engine of my invention, which I shall hereafter describe in detail, is designated to operate at speeds as high as 5000 R. P. M. for continuous operation. I have conceived the necessity for reducing inertia of the parts which must reciprocate at these speeds to an absolute minimum. In general, I provide a valve mechanism operated at crank shaft speed, and I find that by disposing the axis of the valve substantially radially to the crank shaft, I can reduce the reciprocating parts to a minimum. In fact, the valve stem or valve button may be engaged directly with a cam on the crank shaft, or connected to the crank shaft, and operating at crank shaft speed. I may interpose a member to dissociate the rubbing tendency of the cam to thrust the valve laterally of its axis, and I conceive of such a member as merely a yielding wall of minimum inertia. Such a member may be shaped to maintain the bearing of the reciprocating valve member in a direction normal to the axis of the valve member. This same member may likewise have a bearing surface for engagement with a cam to maintain the direction of engagement between these parts substantially constant if so desired.

As above indicated, I prefer to reduce the weight of the valve itself to an absolute minimum and to reduce to a minimum any part interposed between the valve and the cam, and in fact, I may omit any interposed member, but where an interposed member is employed, I prefer to utilize such a member in which the direction of the force transmitted by the thrust of the cam is the same as the direction of movement of the valve without reversal. I have found that bell cranks and the like impose too much inertia, and have a tendency to retard the operation of the valve and produce a hammering and wear of the parts. In the swinging arm of my construction, the rubbing of the cam surface and the rubbing of the valve stem are substantially in parallel planes which ing member. The result is superior operation to a marked degree. In a bell crank, the entire force of operation is brought upon a pivot. That is not the case in the form of construction in which I use a swinging arm between the cam and the valve stem.

An important feature of my invention resides in reducing to a minimum the pressure between parts in rubbing contact, thereby eliminating objectionable wear of parts, which is conducive to accuracy of operation and increased life of the engine. To that end, I provide an inwardly opening and outwardly closing intake valve, whereby an exceptionally light valve spring may be used, or, indeed, the valve spring may be omitted, the valve being held seated during the instroke of the piston by the pressure then obtaining in the crank case. Further, by having the valve open inwardly, this valve will open promptly near the start of the outstroke or suction stroke of the piston, and will remain fully open throughout such stroke—the valve operating cam being appropriately timed to that end—assuring that the maximum possible charge of fuel will be drawn into the crank case with resultant maximum power output of the engine.

Further objects and advantages of my invention will appear from the detail description.

In the drawings:

Figure 1 is a sectional view of a two cylinder engine embodying my invention, taken substantially on line 1—1 of Figure 2, certain parts being shown in elevation;

Figure 2 is a sectional view, taken substantially on line 2—2 of Figure 1, with the intake manifold shown partly in elevation and certain other parts shown in elevation and the neck of the manifold partly broken away and shown in section, the piston being shown at the end of its combustion stroke;

Figure 3 is a view similar to Figure 2, but with the piston moving outward of the cylinder on its compression stroke and in position closing the transfer passage from the corresponding compartment of the crank case;

Figure 4 is a view similar to Figure 3, but with the piston moved inward a short distance on its combustion stroke;

Figure 5 is a plan view of one of the valve seat plates and associated parts;

Figure 6 is a sectional view, on an enlarged scale, taken substantially on line 6—6 of Figure 5, certain parts being shown in elevation; and Figure 7 is a transverse sectional view of the outer section of the crank case and associated parts of a single cylinder engine embodying my invention, certain parts being shown in elevation.

My invention, in its broader aspects, is applicable to two cycle engines of various types and constructions. I have illustrated my invention, by way of example, as applied to a two cycle engine of known type and, in general, of known construction. The engine is shown in simplified form and many of the usual accessories thereof are omitted, for clearness of illustration. While the engine is shown as having two cylinders, it may have but one cylinder or any other desired number of cylinders, as will be understood.

I have illustrated my invention as embodied in a two cycle horizontal engine, that is, an engine in which the cylinders are disposed horizontally, which as noted is in general of known construction and a brief description of which will suffice. The engine comprises a cylinder block 15 defining two cylinders 16 (Figure 1) this block being bolted to a crank case 17 at one side thereof. If desired, cylinder block 15 may be cast integrally with one section of the crank case, as is known and frequently done, which will be readily understood by those familiar with engines of this general type. Crank case 17 is of generally cylindrical shape and conveniently is formed in two sections bolted together, the plane of separation of these sections corresponding to the plane of the axis of the crank shaft, as will appear presently. Sections 18 and 19 of crank case 17 are respectively provided with central transversely extending web elements 18a and 19a which together provide a central bearing member 20 separating the interior of crank case 17 into two separate compartments 24. A crank shaft 21 is rotatably mounted in crank case 17 lengthwise thereof, in appropriate bearing bushings mounted in bearing element 20 and in the end walls of the crank case. A piston 22 operates in each of the cylinders 16 and has operating connection, by means of a connecting rod 23, to crank shaft 21.

The cylinders 16 respectively open, at their inner ends, into compartments 24 of crank case 17. Each of the pistons 22 is provided, at its outer or head end, with an appropriately formed extension 25 for deflecting the entering fuel-air mixture charge toward the outer end of the cylinder and causing displacement from the latter of the burned gases to and through the outlet or exhaust manifold. Each compartment 24 of crank case 17 is provided with a transfer passage 26 extending therefrom and through cylinder block 15, this passage opening into cylinder 16 at a point adjacent the head of piston 22, when the latter is in its innermost position, as shown in Figure 2. A spark plug 27 is mounted in the outer end or head of cylinder 16 for igniting the fuel mixture charge as the piston approaches the end of its outstroke, as is well known in the art. The entering fuel-air charge displaces the burned gases from cylinder 16, these gases flowing through an exhaust port 28 at the opposite side of the cylinder from transfer passage 26, and thence to and through an exhaust manifold 29.

Crank case 17 is provided, at its other side—that is, its side opposite to the cylinder block 15—with an extension or pad 30 having a flat outer face substantially normally to the cylinder axis. The crank case 17 is also provided with two passages 31 inclined outwardly and oppositely with respect to the cylinder axis and disposed at opposite sides of bearing element 20, respectively opening into compartments 24 of crank case 17. The passages 31 are in part formed in the web element 19a and open at their outer ends into cylindrical recesses 31a formed in pad 30 substantially concentric with the respective passages 31. Each passage 31 has therein a guide member 32 which slidably receives stem 33 of a poppet valve 34 controlling port 35 of a valve seat disc 36 mounted on the flat bottom of recess 31a. There are two valve seat discs 36, one for each valve, and port 35 of the respective discs overlies and opens directly into one of the passages 31, the area of plate 36 contiguous to port 35 being appropriately formed to provide a seat for valve 34, as will be understood.

An intake manifold and spring housing member 37 is secured to pad 30, seating on the flat outer face thereof, conveniently by means of cap screws 37a, with an intervening gasket 38. Member 37 is provided with two outwardly extending pockets 39 of generally cylindrical shape overlying and opening directly into the recesses 31a. Each pocket 39 and its corresponding recess 31a receives a compression spring 41 confined between the outer end of pocket 39 and valve 34, the latter having a central projection about which the inner end of spring 41 seats. Member 37 is further provided with a neck 42 defining an inlet passage 43 to which neck 42 may be bolted a stack 45 of a carburetor (not shown) of known type. Each of the pockets 39 opens freely into passage 43, at 46, to receive the fuel-air mixture therefrom.

The stem 33 of each valve 34 is tubular and slidably receives, in its inner end, a plunger 47 urged inward by a compression spring 48 confined between plunger 47 and the wall at the outer end of the bore of valve stem 33. Compression spring 48 is of considerably greater strength than compression spring 41 and provides a yielding connection between plunger 47 and valve 34, for a purpose which will appear presently. The rounded inner end of plunger 47 contacts a cam follower 49 of appropriate formation pivoted at one end, as by means of a screw 50, in a recess 51 formed in the adjacent end of the central bearing element 20. Follower 49 rests upon a suitably shaped cam 52 carried by a crank shaft 21 adjacent the end of central bearing element 20.

In Figure 2 the piston 22 is shown in its innermost position, uncovering the end of transfer passage 26 and the exhaust port 28. As piston 22 approaches that position, the fuel-air mixture, previously compressed in the corresponding compartment 24, enters cylinder 16 through passage 26, scavenging and charging the cylinder. Piston 22 then moves outward on its compression stroke and, when it has traveled a short distance in that direction, first closes the outer end of transfer passage 26 and then the exhaust port 28, as will be clear from Figure 3. As piston 22 closes the outer end of transfer passage 26, the high portion of cam 52 passes beyond follower 49, which then contacts the low portion of the cam. That permits opening of valve 34, by atmospheric pressure, or by spring 41, or by both. In that connection, the outward travel of piston 22, after closing the outer end of passage 26, creates a partial vacuum in compartment 24. The atmospheric pressure on the outer face of valve 34 then moves the latter to open position and in the continued outward travel of piston 22 the charge of fuel-air mixture is drawn into compartment 24, valve 34 being held in full open position by atmospheric pressure. It will be clear that atmospheric pressure alone may be relied upon for opening valve 34 and that spring 41 may be omitted, if desired, though ordinarily I prefer to use the spring 41 as giving added assurance of prompt opening of valve 34.

In the continued outward travel of piston 22, the fuel-air mixture charge in cylinder 16 is compressed. When the piston 22 is at or about its outermost position, the charge is ignited, by the spark plug 27, and the piston 22 moves inward on its combustion or working stroke. Valve 34 remains open for a brief period after the start of the working stroke, and the fuel-air mixture continues to flow into compartment 24, due to inertia of such mixture. When the piston 22 has traveled a short distance on its combustion stroke, to about its position shown in Figure 4, and before it becomes effective for creating pressure in compartment 24, the high portion of cam 52 contacts follower 49 thereby closing valve 34. In the continued travel of piston 22 on its combustion stroke, the fuel-air mixture in compartment 24 is placed under increasing pressure, substantially higher than atmospheric, effective for holding valve 34 tightly closed in sealing contact with its seat. I thus assure that the maximum possible fuel-air charge is drawn into compartment 24 and is retained therein during the combustion period, which is conducive to increased power output and efficiency of the engine. The piston 22 in its continued travel on its combustion stroke uncovers the outer end of transfer passage 26 and the exhaust port 28. The compressed fuel-air mixture charge then enters cylinder 16 under considerable velocity and is deflected toward the outer end of the cylinder by extension 25 of piston 22, scavenging and charging the cylinder, thus completing the cycle. It will be understood, of course, that the operation of the engine is the same with respect to each cylinder, and that the cams 52 for the respective cylinders are oppositely related. In the case of engines of more than two cylinders, the cams are properly timed to assure operation of the valves in the manner above described in proper sequence.

It will be seen, from what has been said, that the valve 34, in the operation of the engine, is subjected to different pressures at its inner and outer faces, and the predominating pressure is always in the direction in which it is desired to urge the valve. Upon creation of a partial vacuum in compartment 24, valve 34 is promptly opened by the then predominating atmospheric pressure, and when the fuel-air mixture within compartment 24 is compressed valve 34 is then held tightly closed by the pressure in compartment 24 then predominating over atmospheric pressure. Accordingly, it is not necessary to use springs or equivalent means for opening or closing valve 34, and the pressure between parts having rubbing or sliding contact is reduced to a minimum, thus avoiding objectionable wear which may occur when such parts are under considerable pressure contact. That is desirable, especially in high speed engines, with which my invention is particularly concerned, as being conducive to increased accuracy with resultant increased over all efficiency of the engine. While the spring 41 may be omitted, as noted above, I preferably use it since I find that with this spring the valve follows the cam follower more closely than without the spring and opens somewhat sooner than it otherwise would. That is conducive to the maximum possible fuel-air charge being drawn into compartment 24, with the advantages above noted. As previously stated, spring 41 is much lighter than spring 48. The combined length of the plunger 47 and spring 48 is such that valve 34 is closed before follower 49 has been moved outward to its maximum extent, spring 48 taking up the additional travel of the follower, thereby assuring complete closing of valve 34 and guarding against possible leakage of the fuel-air mixture from compartment 24.

The recesses 31a are of materially greater diameter than the passages 31, as shown, and the valve seat discs 36 are of slightly less diameter than the respective recesses 31a. Each of the valve seat discs 36 is mounted on pad 30 at the inner end of recess 31a by means of headed screws 55 passing through disc 36, and an underlying gasket 44 with clearance 56, as is shown in Figures 5 and 6. Discs 36 may be mounted in any other suitable manner within the broader aspects of my invention. In mounting disc 36, crank shaft 21 is turned into such position that valve 34 is fully closed and disc 36 is then positioned so that valve 34 seats accurately therein and is then secured in position by the screws 55. After both of the discs 36 have been properly positioned and secured, the member 37 is bolted in position, as previously described.

In the single cylinder engine of Figure 7, outer section 58 of crank case 59 is provided with an inlet passage 60 having therein a valve stem guide element 61, and with a pad 62 having a flat outer face on which is mounted a valve seat plate 63, with an intervening gasket 64. Plate 63 has therein a valve port 35a opening into passage 60 and controlled by valve 34, as before. An intake manifold member 65 is bolted to pad 62 at the outer face of plate 63, with an intervening gasket 66. Member 65 has a pocket 67 receiving compression spring 41, when used, and opening into a neck 68 for attachment of a carburetor stack (not shown). Web element 19b of crank case section 59 is recessed at 51a for reception of a cam follower 49 pivotally mounted at 50, as before. Follower 49 cooperates with cam 52a of crankshaft 21a and with valve 34. The operation of the single cylinder engine of Figure 7, is the same as that of the engine of Figures 1 to 4, inclusive, and requires no further description. The cap screws 37a pass through valve seat plate 63 with clearance, and this plate may be adjusted to assure accurate seating of valve 34 before tightening up cap screws 37a. Accordingly, it is not necessary to provide separate means for adjusting plate 63 and securing it in adjustment preliminary to securing member 65 in position, though separate means may be provided if desired. While the structure of Figure 7 has been described as used for a single cylinder engine it may, if desired, be used for multi-cylinder engines. I prefer, however, to use, for multi-cylinder engines, the structure of Figures 1 to 4, inclusive, since inclining the valves oppositely permits of their being disposed in proximity to the ends of the web element of the crank case, which saves space and provides a compact arrangement of parts.

As above indicated, and as will be understood by those skilled in the art, changes in details may be resorted to without departing from the field and scope of my invention, and I intend to include all such variations, as fall within the scope of the appended claims, in this application in which the preferred forms only of my invention have been disclosed.

I claim:

1. In a two cycle internal combustion engine, a crank case defining a fuel mixture receiving compartment, a cylinder opening at one end into said compartment, a crank shaft rotatably mounted in said compartment, a piston operating in said cylinder having operating connection to said shaft, said engine having a transfer passage leading from said compartment and a fuel mixture intake port opening into said compartment, an inwardly opening and outwardly closing valve controlling said port urged in closing direction by pressure in said compartment, and means for closing said valve and releasing it for free inward opening movement in predetermined timed relation to rotation of said shaft.

2. In a two cycle internal combustion engine, a crank case defining a fuel mixture receiving compartment, a cylinder opening at one end into said compartment, a crankshaft rotatably mounted in said compartment, a piston operating in said cylinder having operating connection to said shaft, said engine having a transfer passage leading from said compartment and a fuel mixture intake port opening into said compartment, an inwardly opening and outwardly closing valve controlling said port urged in closing direction by pressure in said compartment, and means in said compartment comprising cam means on said shaft for closing said valve and releasing it for free inward opening movement in predetermined timed relation to rotation of said shaft.

3. In a two cycle internal combustion engine, a crank case defining a fuel mixture receiving compartment, a cylinder opening at one end into said compartment, a crank shaft rotatably mounted in said compartment, a piston operating in said cylinder having operating connection to said shaft, said engine having a transfer passage leading from said compartment and a fuel mixture intake passage opening at its inner end directly into said compartment and provided with an intake port at its outer end, an inwardly opening and outwardly closing valve controlling said port urged in closing direction by pressure in said compartment, said valve having a stem extending inward of said passage, and means in said compartment comprising a cam member on said shaft cooperating with said valve stem for closing said valve and releasing it for free inward opening movement in predetermined timed relation to rotation of said shaft.

4. In a two cycle internal combustion engine, a crank case having a central bearing element and defining two separate fuel mixture receiving compartments, said crank case having at one side a wall with a flat outer surface, a pair of cylinders at the opposite side of said crank case respectively opening at one end into said compartments, a crank shaft rotatably mounted in said crank case, a piston operating in the respective cylinders having operating connection to said shaft, said engine having intake ports respectively opening into said compartments and transfer passages respectively leading from said compartments, inwardly opening and outwardly closing valves controlling said ports disposed with their axes at opposite ends of said bearing element substantially radial to said shaft, said valves being urged in closing direction by pressure in said compartments, and means comprising cams on said shaft adjacent the ends of said bearing element for closing said valves and releasing them for free inward opening movement in predetermined timed relation to rotation of said shaft.

5. In a two cycle internal combustion engine, a crank case defining a fuel mixture receiving compartment, a cylinder opening at one end into said compartment, a crank shaft rotatably mounted in said compartment, a piston operating in said cylinder having operating connection to said shaft, said engine having a transfer passage leading from said compartment and a fuel mixture intake port opening into said compartment, an inwardly opening and outwardly closing valve controlling said port urged in closing direction by pressure in said compartment and yieldingly urged in opening direction, and means for closing said valve and releasing it for inward opening movement in predetermined timed relation to rotation of said shaft, opening of said valve being unopposed except as controlled by said means.

6. In a two cycle internal combustion engine, a crank case defining a fuel mixture receiving compartment, a cylinder opening at one end into said compartment, a crank shaft rotatably mounted in said compartment, a piston operating in said cylinder having operating connection to said shaft, said engine having a transfer passage leading from said compartment and a fuel mixture intake passage opening at its inner end directly into said compartment and provided with an intake port at its outer end, an inwardly opening and outwardly closing valve controlling said port urged in closing direction by pressure in said compartment, said valve having a stem extending inward of said passage, and means in said compartment contacting the inner end of said valve stem comprising a cam member on said shaft cooperating with said valve stem for closing said valve end releasing it for free inward opening movement in predetermined timed relation to rotation of said shaft, said valve stem being yieldable lengthwise under pressure applied thereto by said cam member after closing of said valve.

7. In a two cycle internal combustion engine, a crank case defining a fuel mixture receiving compartment, a cylinder opening at one end into said compartment, a crank shaft rotatably mounted in said compartment, a piston operating in said cylinder having operating connection to said shaft, said engine having a transfer passage leading from said compartment and a fuel mixture intake passage opening at its inner end directly into said compartment and provided with an intake port at its outer end, an inwardly opening and outwardly closing valve controlling said port urged in closing direction by pressure in said compartment and yieldingly urged in opening direction, said valve having a stem extending inwardly of said passage comprising two telescoping members and spring means urging them apart, means of less strength than said spring means yieldingly urging said valve in opening direction, and means contacting the inner end of said valve stem comprising a cam member on said shaft cooperating with said valve stem for closing said valve and releasing it for inward opening movement in predetermined timed relation to rotation of said shaft, opening of said valve being unopposed except as controlled by said last means.

8. In a two cycle internal combustion engine, a crank case defining a fuel mixture receiving compartment, a cylinder opening at one end into said compartment, a crank shaft rotatably mounted in said compartment, a piston operating in said cylinder having operating connection to said shaft, said compartment having a transfer passage leading from said compartment and a fuel mixture intake passage opening at its inner end directly into said compartment, a valve seat member mounted on said crank case having an intake port overlying the outer end of said intake passage and a valve seat surrounding said port, an inwardly opening and outwardly closing valve cooperating with said seat for controlling said port, and means for closing said valve and releasing it for free inward movement in predetermined timed relation to rotation of said shaft.

9. In an internal combustion engine utilizing crank case compression for charging the combustion space, a crank case having a fuel mixture intake passage opening at its inner end into said crank case provided at its outer end with an intake port, an inwardly opening and outwardly closing intake valve controlling said port, a crank shaft in said case, said valve having a stem extending inward therefrom through said passage, and means contacting the inner end of said valve stem comprising a cam on said shaft for closing said valve and permitting opening thereof in predetermined timed relation to rotation of said shaft, opening of said valve being unopposed except as controlled by said means and said valve being urged in closing direction by pressure in said crank case.

10. In an internal combustion engine utilizing crank case compression for charging the combustion space, a crank case having a fuel mixture intake passage opening at its inner end into said crank case provided at its outer end with an intake port, an inwardly opening and outwardly closing intake valve controlling said port yieldingly urged in opening direction, a crank shaft in said case, said valve having a stem extending inward therefrom through said passage, and means contacting the inner end of said valve stem comprising a cam on said shaft for closing said valve and permitting opening thereof in predetermined timed relation to rotation of said shaft, opening of said valve being unopposed except as controlled by said means and said valve being urged in closing direction by pressure in said crank case.

GILBERT E. BUSKE.

REFERENCES CITED

The following references are of record in the file of this patent:

UNITED STATES PATENTS

| Number | Name | Date |
|---|---|---|
| 1,445,319 | Jelbart | Feb. 13, 1923 |
| 2,289,201 | Martin | July 7, 1942 |

FOREIGN PATENTS

| Number | Country | Date |
|---|---|---|
| 639,806 | France | 1928 |